Sept. 29, 1959  J. BROUWER  2,906,241
LIVESTOCK FEEDER
Filed March 13, 1958  2 Sheets-Sheet 1
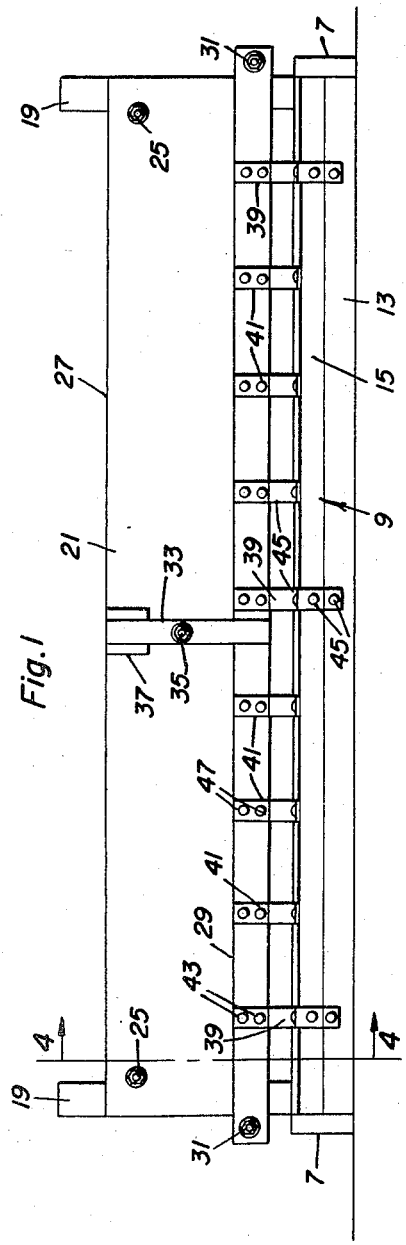
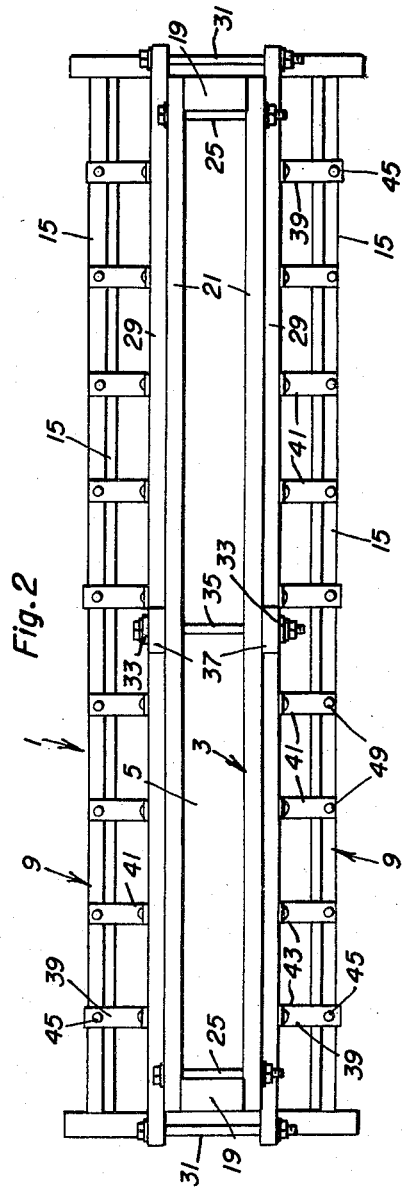
Jasper Brouwer
INVENTOR.

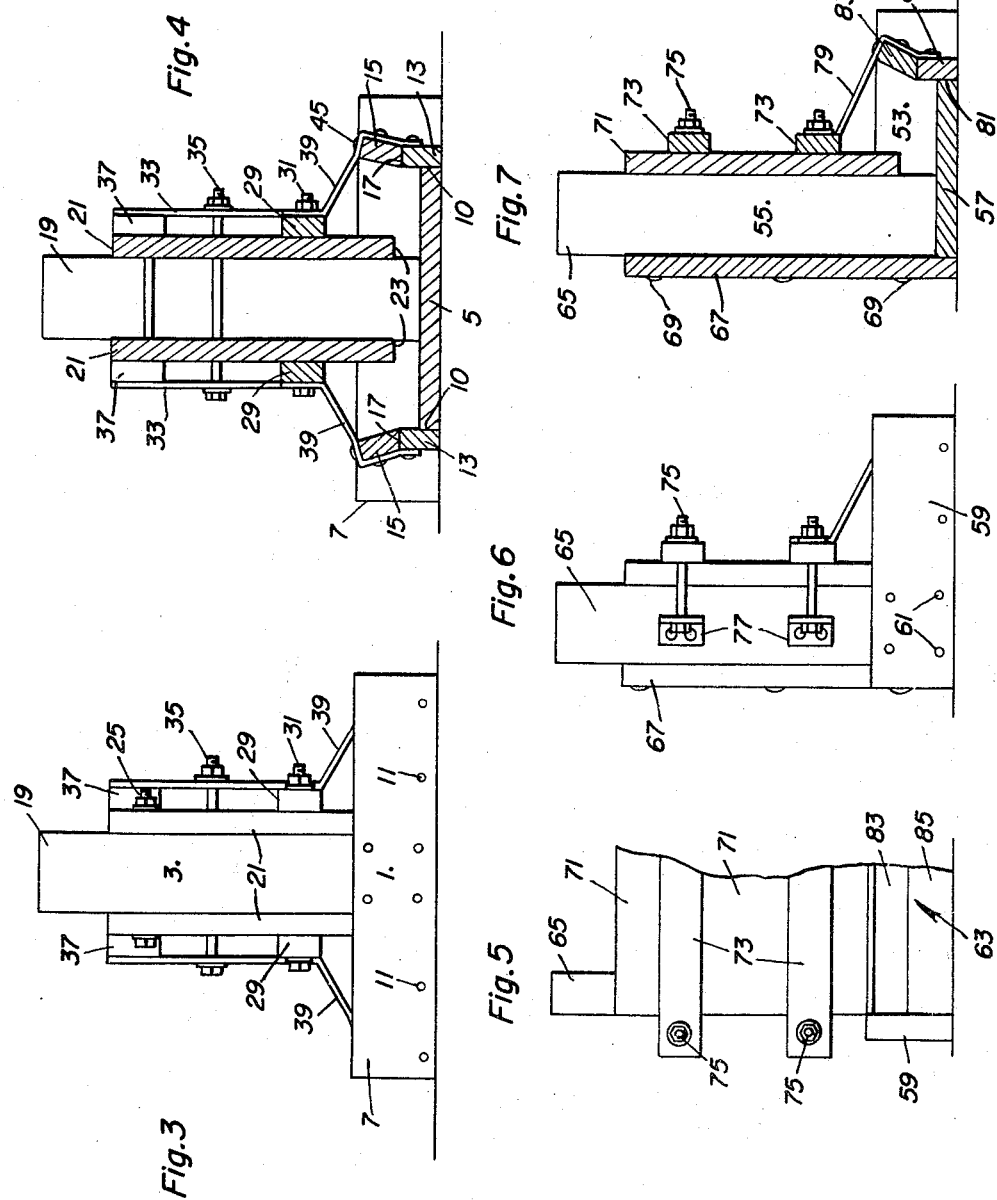

2,906,241

LIVESTOCK FEEDER

Jasper Brouwer, Rock Rapids, Iowa

Application March 13, 1958, Serial No. 721,239

1 Claim. (Cl. 119—53)

My invention relates to improvements in livestock feeders for pigs, especially, although not necessarily.

The primary object of my invention is to provide a feeder in which a feeding trough is supplied with feed to a selected level from a gravity feed hopper and which may be quickly knocked down and taken apart for cleaning purposes, or storage or carrying.

Another object is to provide a feeder according to the foregoing, the parts of which are firmly held together by fastener means readily removable to permit the feeder to be knocked down and easily and quickly replaceable to secure the parts of the feeder together.

Still another object is to provide fastener means for securing parts of the feeder together which act as separator guards for pigs or other animals feeding out of the trough and for preventing the pigs or animals from interfering with each other during feeding.

Still another object is to provide in such a feeder a gravity feed supply hopper having straight parallel sides and parallel ends to prevent clogging of feed in the hopper, and means for readily adjusting the sides of the hopper vertically to determine the level of feed supplied in the trough.

Yet another object is to provide a feeder of simple practical construction which is inexpensive to manufacture, durable, not easily overturned and may be made principally of selected lengths of stock lumber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of my improved stock feeder in the preferred embodiment thereof;

Figure 2 is a view in plan of the same;

Figure 3 is an enlarged view in end elevation of the same;

Figure 4 is an enlarged view in vertical transverse section taken on the line 4—4 of Figure 1;

Figure 5 is an enlarged fragmentary view in front elevation of a modified embodiment of the feeder;

Figure 6 is an enlarged view in end elevation of the same; and

Figure 7 is an enlarged view in vertical transverse section of the same.

Referring to the drawings by numerals and first to Figures 1 to 4, my improved feeder as shown in the preferred embodiment thereof for illustration purposes is constructed principally of stock pieces of lumber, although it may be constructed of other material as will presently be apparent. The trough of the feeder and the hopper are designated generally by the numerals 1, 3, respectively, and will now be described in detail.

The trough 1 which is of elongated rectangular form comprises an oblong rectangular flat bottom member 5, and a pair of oblong end members 7 abutting the ends of said bottom member 5 and extending endwise transversely of said bottom member 5 flush with the bottom face of the member 5 and rising above and extending outwardly beyond both sides of said bottom member 5, and like elongated sides designated generally by the numeral 9 and which fits endwise between the end members 5 and against the side edges 10 of the bottom member 5. The end members 7 are preferably fixed to the ends of the bottom member 5 as by nails 11. The sides 9 each embody a lower longitudinal section 13 and a coextensive upper longitudinal section 15 seated by a bevelled lower edge 17 on the lower section 13 to incline upwardly and outwardly so that the sides 9 of the trough 1 flare outwardly at their upper edges for a purpose which will be apparent.

The hopper 3 is of horizontally elongated rectangular form and extends from end to end of the trough 1 and comprises a pair of elongated, upright, rectangular end members 19 narrower than the bottom member 5 and which are removably seated on the bottom member 5 between and in engagement with the end members 7 in upstanding position in the longitudinal center of the bottom member 5.

A pair of opposite hopper side panels 21 are clamped by securing means, presently described, to opposite side edges of the end members 19 in vertically spaced relation to the bottom member 5 and in inwardly spaced relation to the sides 9 of the trough 1. As will be seen, an open bottom hopper 13 is thus provided in the longitudinal center of the trough 1 which is removable and is narrower than the trough 1 so that stock may feed from both sides of the trough 1 and whereby feed from the hopper 3 will be supplied by gravity to the trough 1 to flow into both sides of the trough to the level of the bottom edges 23 of the side panels 21. As will presently be manifest, the side panels 23 are vertically adjustable manually to predetermine the level of feed in the trough 1.

Clamping means is provided for vertically adjustably securing the side panels 21 of the hopper 3 at their ends to the end members 19 comprising the following. A pair of removable transverse bolts 25 extend between said side panels 21 adjacent the upper edges 27 of the side panels 21 at the inner faces of said end members 19. A pair of opposite clamping beams 29 extend horizontally longitudinally along the outer faces of the side panels 21 adjacent their bottom edges 23 and above the trough 1 and are secured together at their ends by removable transverse bolts 31 disposed outwardly of the end members 19.

To prevent the side panels 21 and the clamping beams 29 from bulging outwardly, means is provided comprising a pair of vertical scrap iron clamping bars 33 in the transverse center of said side panels 21 and the beams 29 and a removable bolt 35 extends centrally through said bars 23 and through the side panels 21 in the transverse center of the latter and which clamps the lower ends of said bars 33 against the outer sides of the beams 29 and the upper ends of said bars 33 against a pair of blocks 37 fixed on the side panels 21 at the upper edges 27 of said panels.

Scrap iron, long and short angular bars 39, 41 respectively spaced longitudinally of the trough 1 and hopper 3 act in conjunction with the clamping means for the side panels 21, described in the foregoing, as means for clamping the sides 9 against the side edges 10 of the bottom member 5 and to center the hopper 3 in the longitudinal center of the trough 1. These bars 39, 41 extend from the clamping beams 29 outwardly transversely over opposite sides of the trough 1 and act as guards for separating feeding pigs or the like. The long bars 39 are hook-shaped and hook over the sides 9 and are terminally bolted as at 43 to the beams 29 and bolted as at 45 to the sections 13, 15 of the sides 9 to hold said sections together. The short bars 41 are terminally bolted, as at 47, to said beams 29 and, as at 49, to the top edges of the upper sections 15 of the sides 9.

Referring now to the operation of the described preferred embodiment of the feeder, the feed, grain, mash or the like is introduced into the hopper 3 to gravitate into the trough 1 and fill the trough to the level determined by vertical adjustment of the side panels 21. Such vertical adjustment may be accomplished by loosening the bolts 25, 31, 35 to unclamp the side panels 21 and then lifting or lowering said panels 21 manually and tightening the bolts 25, 31, 35 to secure the side panels 21 in adjusted position. During such adjustment of the side panels 21, the bolts 25, 31 hold the end members 19 of the hopper 3 upright. By removing the bolts 25, 31, 35 the clamping bars 33 may be removed and the clamping beams 29 and sides 9 removed as units and the side panels 21 and end members of the hopper removed whereby the feeder may be completely knocked down for cleaning, storing or carrying. The bottom and end members 7 may be cleaned as a unit or taken apart in a manner which will be obvious. The manner in which the parts may be secured together will be readily understood from the foregoing description of the manner in which the parts may be taken apart for knockdown purposes.

The feeder of the modified embodiment shown in Figures 5 to 7 is adapted for feeding from one side thereof only and is also shown for illustrative purposes as constructed of stock lumber although like the preferred embodiment it may be constructed of other materials. In this embodiment, an elongated rectangular trough 53 at one side of the feeder is provided and the hopper 55 at the other side. The trough 53 comprises an oblong rectangular, flat bottom member 57 transverse end members 59 nailed as at 61, to the ends of the bottom member as in the preferred embodiment, and a sectional front side 63 like the sides 9 of the preferred embodiment fitted between the end members 59.

The hopper 55 which, as in the preferred embodiment, is horizontally elongated and rectangular and extends from end to end of the trough 1 comprises upright rectangular end members as at 65, like the end members 19 upstanding from and removably seated on the bottom member 57 but at the rear of said bottom member 57. A rear side panel 67 of the hopper 55 is nailed, as at 69 to the rear longitudinal edge of the end members 65 in engagement with the bottom 57. A front side panel 71 for the hopper parallel with the rear side panel 67 is clamped by securing means, presently described to the end members 65 in vertically spaced relation to the bottom member 57 like the side panels 21 and for vertical adjustment as in the preferred embodiment to determine the level of feed in the trough 53.

The clamping means in the modified embodiment comprises a pair of upper and lower clamping beams 73 extending horizontally and longitudinally along the outer face of the front side panel 71. Transverse, removable bolts 75 disposed outwardly of the end members 65 connect the ends of the beams 73 to angle brackets 77 fixed to the end members 65.

Scrap iron angle bars as in the case of the preferred embodiment and for the same purpose and one of which is shown, at 79, connect the lower clamp beam 73 to the front side 63 of the trough 53 to act in conjunction with the lower clamping beam 73 to clamp the front side 63 of the trough to the front longitudinal edge 81 of the bottom member 57 and secure the upper and lower sections 83, 85 of said front side 63 together. By loosening the bolts 75 the front side panel 71 may be vertically adjusted as desired. By removing the bolts 75 the feeder may be knocked down in a manner which will be understood from the description of the preferred embodiment. It is to be noted that in the modified embodiment the rear side panel 67 is removable with the end members 65 and said rear side panel 67 forms and closes the rear side of the trough 53.

As will be seen in both embodiments of the feeder, said feeder may rest flat on the ground or a floor to be shoved over the same by sliding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a knockdown livestock feeder, an elongated rectangular trough having a rectangular flat bottom and ends and removable sides, a hopper for supplying feed to said trough extending in the longitudinal center of said trough from end to end thereof and spaced from said sides to provide for livestock feeding from both sides of the trough, said hopper having end members upstanding from said bottom and removably seated thereon, said hopper having vertical removable side panels vertically adjustable to variably space the same from said bottom to determine the level of feed in the trough supplied from said hopper, removable clamping means for clamping said side panels to said end members in adjusted position, said removable means comprising a pair of opposite clamping beams extending horizontally along outer sides of said panels, a pair of opposite blocks disposed against the outer sides of said panels above said beams, a pair of upright bars traversing the beams and blocks outwardly thereof, and a bolt extended through said bars and said panels between the pair of beams and the pair of blocks for clamping the bars against said pairs of beams and blocks.

References Cited in the file of this patent

UNITED STATES PATENTS 1,265,025    Aker                 May 7, 1918